(12) United States Patent
Takanashi et al.

(10) Patent No.: US 6,428,070 B1
(45) Date of Patent: Aug. 6, 2002

(54) CHUCK WITH POSITION DETECTING FUNCTION

(75) Inventors: Seiji Takanashi; Satoru Ito; Koichiro Kanda, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/684,672

(22) Filed: Oct. 11, 2000

(51) Int. Cl.⁷ .............................. B25J 15/08; B25J 19/02
(52) U.S. Cl. ...................... 294/88; 294/119.1; 294/907; 901/37; 901/46
(58) Field of Search .................. 294/88, 115, 119.1, 294/907; 901/36, 37, 46

(56) References Cited

U.S. PATENT DOCUMENTS

| | | | |
|---|---|---|---|
| 4,456,293 A | * 6/1984 | Panissidi | 294/106 |
| 4,579,380 A | 4/1986 | Zaremsky et al. | |
| 4,667,998 A | * 5/1987 | Borcea et al. | 294/116 |
| 4,682,805 A | * 7/1987 | Reynolds | 294/86.4 |
| 5,090,757 A | * 2/1992 | Huber et al. | 294/119.1 |
| 5,201,838 A | 4/1993 | Roudant | |

FOREIGN PATENT DOCUMENTS

| | | |
|---|---|---|
| EP | 0 293 153 | 11/1988 |
| GB | 2 322 116 | 8/1998 |

* cited by examiner

Primary Examiner—Dean J. Kramer
(74) Attorney, Agent, or Firm—Oblon, Spivak, McClelland, Maier & Neustadt, P.C.

(57) ABSTRACT

A plurality of jaw members 3, 3 for gripping a work piece on a casing 2, to be opened or closed freely, a driving part 4 having a driving rod 9 to be moved linearly, reciprocally, a converting mechanism 7 for converting the linear reciprocal motion of the driving rod 9 into the opening or closing operation of the jaw members 3, 3, a position detecting part 5 capable of detecting the operating position of the jaw members 3, 3 for all the stroke, comprising a scale 33 displaced synchronous with the driving rod 9, and a reader 34 for reading the calibration engraved on the scale 33, and a linear guide mechanism 6 for guiding the linear reciprocal movement of the scale 33.

6 Claims, 3 Drawing Sheets

CHUCK WITH POSITION DETECTING FUNCTION

TECHNICAL FIELD

The present invention relates to a chuck for transporting to a target place a work piece gripped by a aplurality of jaw members to be opened or closed freely, more specifically, it relates to a chuck with a position detecting function capable of detecting the operating position of the jaw members.

PRIOR ART

A chuck storing an air cylinder utilizing the air pressure, a linear motor utilizing the electromagnetic force, or the like, as the driving source for gripping a work piece by opening or closing a plurality of jaw members by the function of the air cylinder or the linear motor has been well known conventionally.

As this kind of a chuck, there is one provided with a position detecting device utilizing the magnetism for detecting the opening or closing position of the jaw members. The position detecting device comprises a permanent magnet mounted on a driving rod of the air cylinder or the linear motor, or mounted on the jaw members, and a magnetic sensor mounted on the casing side so that the opening or closing position of the jaw members can be detected according to the detection of the permanent magnet by the magnetic sensor.

However, since the above-mentioned conventional position detecting device is of a system of detecting the permanent magnet mounted on the driving rod or the jaw members, only the opening or closing stroke end positions of the jaw members, that is, the position with the jaw members gripping a work piece or with the jaw members opened can be detected but the operating position of the jaw members has never been detected for all the strokes.

DISCLOSURE OF THE INVENTION

A main technological task of the present invention is to provide a chuck with a position detecting function capable of detecting the operating position of a jaw member for all the stroke.

Another technological task of the present invention is to provide a chuck with a reasonable designing structure with a driving part for opening or closing a jaw member, and a position detecting part for detecting the operating position of the jaw member assembled in a casing efficiently with other mechanisms without causing enlargement.

A still another technological task of the present invention is to obtain a stable opening or closing operation in the chuck by preventing the opening or closing operation of the jaw member from becoming unsmooth by assembling the driving part and the position detecting part bonded organically in the casing.

DISCLOSURE OF THE INVENTION

In order to solve the above-mentioned problem, according to the present invention, a chuck with a position detecting function characterized in comprising a plurality of jaw members provided on a casing, to be opened or closed freely; a driving part provided on the base end part side in the axial direction of the casing, positioned on either right or left one half part side of the casing; a position detecting part for detecting the operating position of the jaw members for all the stroke according to a scale displaced synchronous with a driving rod of the driving part provided at a right and left position adjacent to the driving part on the base end part side of the casing, and a reader for reading the calibration engraved on the scale; a linear guide mechanism provided between the driving part and the position detecting part for guiding the linear reciprocal movement of the scale; and a converting mechanism provided between the jaw members and the driving part for converting the linear reciprocal motion of the driving rod into the opening or closing operation of the jaw members can be provided.

In the chuck with the above-mentioned configuration, the jaw members are opened or closed according to the movement of the driving rod of the driving part so as to grip or release a work piece. At the time, since the calibration on the scale moving synchronously with the driving rod is read out continuously by the reader, the operating position of the jaw members is detected for all the opening and closing stroke.

Here, since the driving part, the position detecting part, and the linear guide mechanism are assembled efficiently in the casing at right and left adjacent positions so as to be stored within the width of the casing, that is, in the installation domain of the jaw members, the chuck cannot be enlarged by the addition of the position detecting part, the linear guide mechanism, or the like. Besides, since the linear guide mechanism is provided between the driving part and the position detecting part, the scale can be displaced stably in the state synchronous with the driving rod as well as the movement of the driving rod can be transmitted certainly to the jaw members via the converting mechanism so as to open or close the jaw members stably.

According to a concrete embodiment of the present invention, the converting mechanism comprises two levers for opening or closing the jaw members by swaying, and a relay plate for interlocking the levers with the driving rod, wherein the relay plate is provided with a relay shaft positioned on the chuck center, with the base end part of each lever pivoted on the relay shaft rotatably by a common shaft, and the relay plate is interlocked with the driving rod and a scale supporting member for supporting the scale, displaceably together to different positions with the relay shaft interposed therebetween via the relay plate.

According to another concrete embodiment of the present invention, the linear guide mechanism comprises a guide rail and a slider slidable along the guide rail, wherein the guide rail is fixed on the outer wall of the driving part, parallel with the driving rod, and the slider is mounted on the scale side.

In the case the driving rod is interlocked with the relay plate, in order to prevent twisting, it is preferable to interlock by a floating method with a collar interposed so as to provide a slight freedom therebetween in the tilt direction.

According to an embodiment of the present invention, the driving part includes a linear motor to be operated by an electromagnetic force such that the driving rod is moved forward or backward by the linear motor.

The linear motor comprises a cylindrical magnetic frame made of a magnetic member, a non-magnetic member bobbin stored in the magnetic frame, a plurality of magnetic coils wound around on the bobbin, and a piston assembly inserted in the bobbin slidably in the axial direction, interlocked with the driving rod, wherein the piston assembly is formed by mounting a plurality of circular permanent magnets on the outer periphery of the driving rod with a yoke interposed therebetween.

According to another embodiment of the present invention, the driving part includes a fluid pressure cylinder mechanism to be operated by the fluid pressure such that the driving rod is moved forward or backward by the fluid pressure cylinder mechanism.

DETAILED DESCRIPTION

Hereinafter, preferable representative embodiments of a chuck with a position detecting function according to the present invention will be explained in detail with reference to the drawings.

Figure 1:
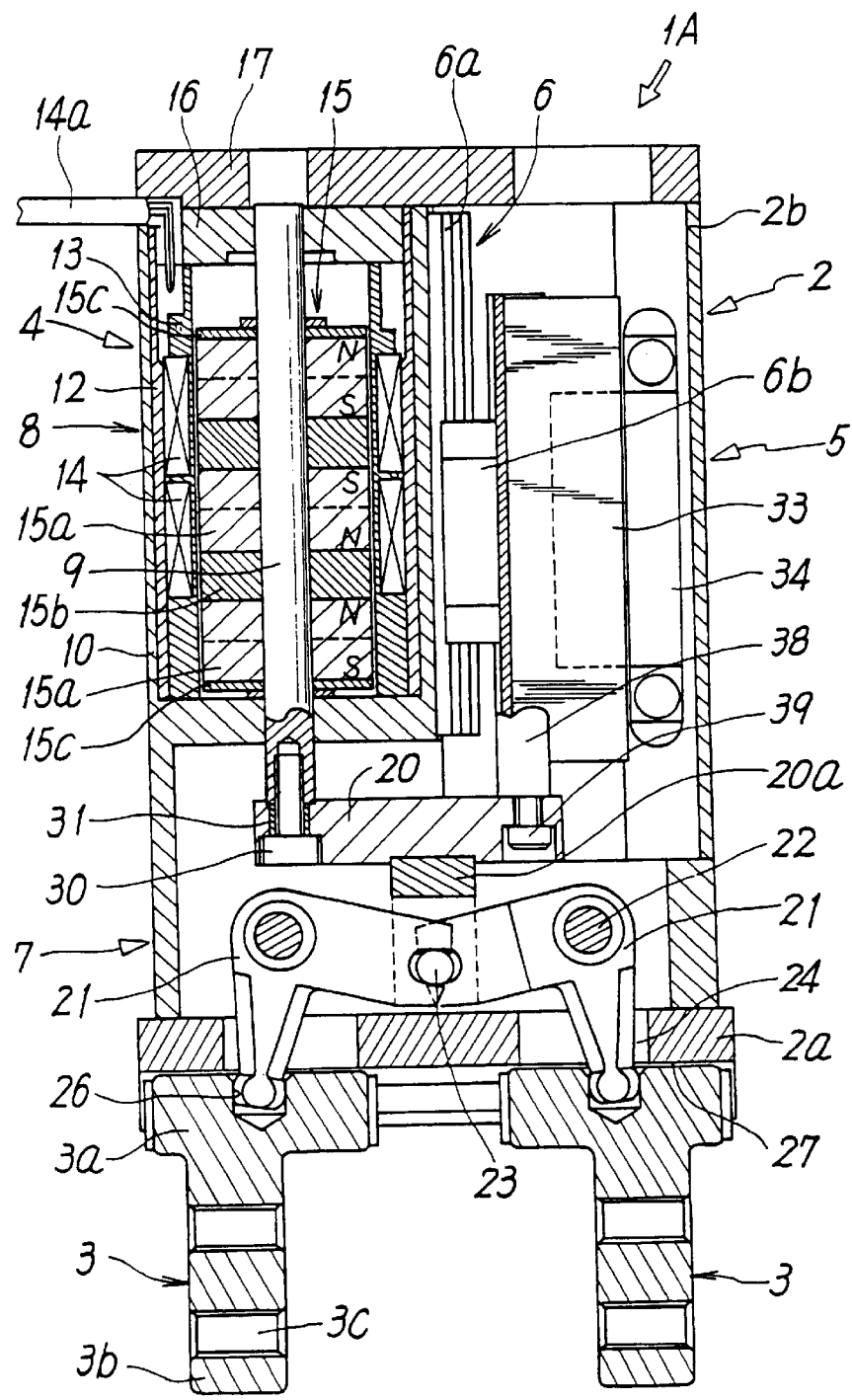
FIG. 1 is a vertical cross-sectional front view showing a first embodiment of a chuck according to the present invention.
Figure 2:
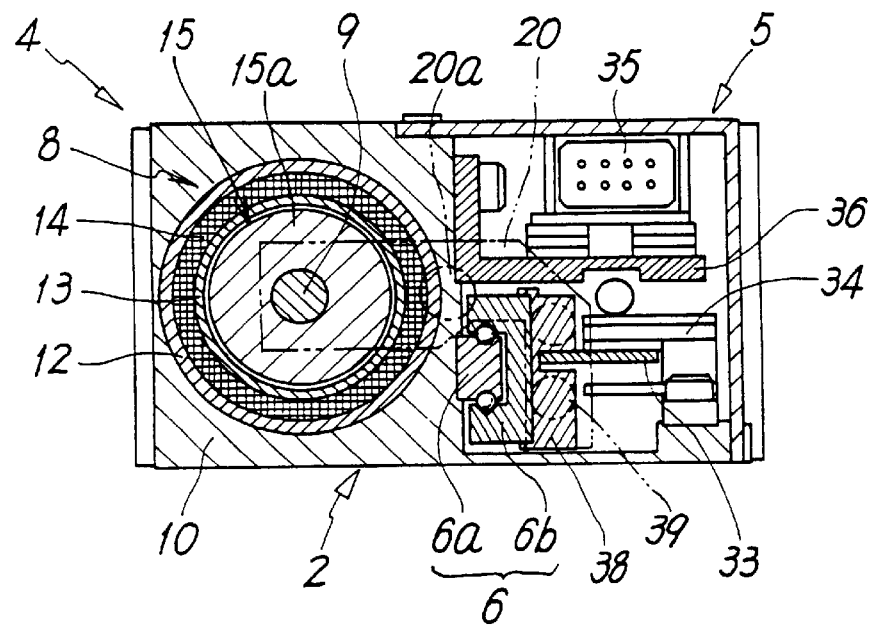
FIG. 2 is a lateral plan view of the chuck of FIG. 1.
Figure 3:
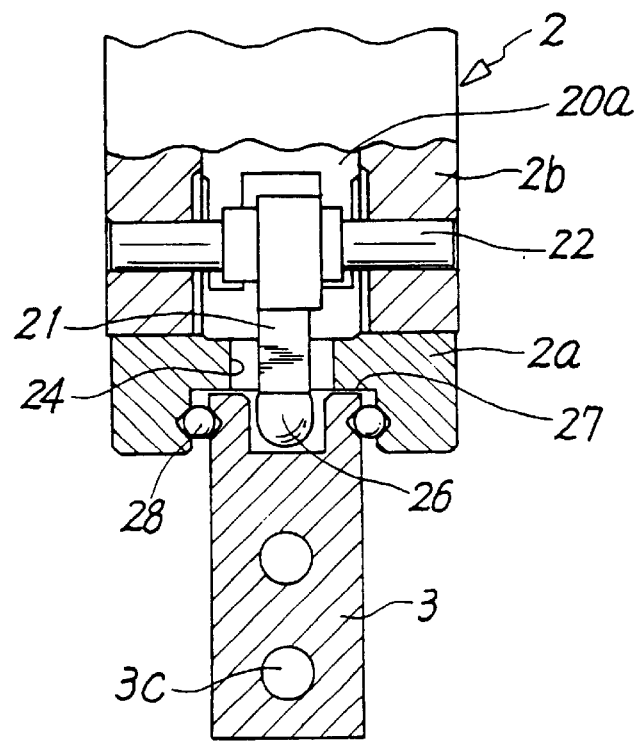
FIG. 3 is an essential part side cross-sectional view of the chuck of FIG. 1.

FIGS. 1 to 3 show a first embodiment of the present invention. The chuck 1A of the first embodiment uses a linear motor utilizing the electromagnetic force as the driving source for opening or closing jaw members 3, 3. More specifically, the chuck 1A comprises a casing 2 with a prism-like shape as a whole, a plurality of jaw members 3, 3 for gripping a work piece, provided on the axial direction tip end part of the casing 2, to be opened or closed freely, a driving part 4 having a driving rod 9 to be moved linearly, reciprocally in the axial direction of the casing 2, provided on the base end part side in the axial direction of the casing 2 on either right or left one half part side, a position detecting part 5 capable of detecting the operating position of the jaw members 3, 3 for all the stroke, provided at a right and left position adjacent to the driving part 4, a linear guide mechanism 6 provided between the driving part 4 and the position detecting part 5, and a converting mechanism 7 provided between the jaw members 3, 3 and the driving part 4 for converting the linear reciprocal motion of the driving rod 9 into the opening or closing operation of the jaw members 3, 3.

The casing 2 comprises a rectangular plate-like first member 2a, and a longitudinal prism-like second member 2b mounted on the first member 2a. The two jaw members 3, 3 are supported to be opened or closed freely by the first member 2a in the direction orthogonal to the axis of the casing 2. The driving part 4, the position detecting part 5 and the linear guide mechanism 6 are provided side by side on the second member 2b.

The driving part 4 has a cylindrical part 10 formed as a part of the casing 2, with a linear motor 8 stored in the cylindrical part 10. The linear motor 8 comprises a cylindrical magnetic frame 12 made of a magnetic member, a non-magnetic member bobbin 13 stored in the magnetic frame 12, a plurality of magnetic coils 14 wound around on the bobbin 13, and a piston assembly 15 inserted in the bobbin 13 slidably in the axial direction. The piston assembly 15 is formed by mounting a plurality of circular permanent magnets 15a on the outer periphery of the driving rod 9 passing through the center part of the cylindrical part 10 slidably with a yoke 15b interposed therebetween. The permanent magnets 15a are provided by polarizing the N pole and the S pole on both surface in the axial direction, disposed with the polarities disposed alternately. In other words, the N poles and the S poles of the adjacent magnets 15a, 15a are disposed facing with each other, fixed on a predetermined position on the driving rod 9 by a pressing plate 15c.

In the figure, the numeral 16 denotes a piston cover mounted on one end of the cylindrical part 10, and 17 a cap mounted outside thereof. The end part of the driving rod 9 is supported by the piston cover 16 slidably.

Therefore, in the driving part 4, in the case a direct current is applied on the magnetic coils 14 via a lead line 14a in the positive direction or the reverse direction, the piston assembly 15 is moved forward or backward according to the current direction, and the driving rod 9 is moved reciprocally.

The tip end of the driving rod 9 is interlocked with a relay plate 20 with a substantially L-shape in the plan view, comprising a part of the converting mechanism 7. Two levers 21, 21 as main components of the converting mechanism 7 are interlocked with the relay plate 20. The levers 21, 21 are disposed symmetrically on the right and left sides in a space part between the first member 2a and the second member 2b of the casing 2. The middle part of each lever 21 is pivoted on the casing 2 rotatably by the shaft 22. Moreover, the base end part of each lever 21 is pivoted rotatably by a relay shaft 20a elongating from the relay plate 20 so as to be at the center of the chuck by a common supporting shaft 23. The tip end part of each lever 21, 21 is fitted in a hole 24 of the second member 2b so as to be interlocked with the two jaw members 3, 3 individually.

The jaw members 3, 3 comprise a first part 3a having a recess part 26 on the upper surface center part, and a second part 3b projecting from the first part 3a in a T-shape or an L-shape. As shown in FIG. 3, the first part 3a is fitted slidably in a guide groove 27 formed on the front surface of the second member 2b so as to be supported along the guide groove 27 to be linearly opened or closed freely. A plurality of spherical or roll-like rollers 28 are disposed in a slide groove formed on the outer side surface of the first part 3a and the inner side surface of the guide groove 27 facing with each other so that the opening or closing operation of the jaw members 3, 3 is executed smoothly by the rollers 28. Accordingly, the guide groove 27 and the first part 3a of the jaw members 3, 3 provide a linear guide mechanism for linearly guiding the opening or closing operation of the two jaw members 3, 3.

Moreover, the relay plate 20 is interlocked with the driving rod 9 by a bolt 30 at a position different from the relay shaft 20a so as to be moved forward or backward together according to expansion or contraction of the driving rod 9. According to the forward or backward movement of the relay plate 20, the levers 21, 21 are swayed around the shaft 22 so that the pair of the jaw members 3, 3 are opened or closed so as to grip or release a work piece therebetween. Actually, an attachment suited for the work piece is mounted, utilizing a mounting hole 3c provided in the jaw members 3, 3 so that the work piece is gripped by the attachment.

In the case the driving rod 9 is interlocked with the relay plate 20, in order to prevent twisting by tilting, it is preferable to interlock by a floating method with a collar 31 interposed therebetween so as to provide a slight freedom therebetween in the tilt direction.

The position detecting part 5 comprises a plate-like glass scale 33 with a large number of linear calibrations engraved on the surface with a constant pitch, and an encoder reader 34 for reading out the calibration on the scale 33 for outputting a read signal. The scale 33 is mounted on a scale supporting member 38. The scale supporting member 38 is fixed on the relay plate 20 by a bolt 39 at a substantially different position on the side opposite to the driving rod 9 with respect to the relay shaft 20a. The reader 34 on one side is fixed on a certain position on the casing 2.

Moreover, a wave form former 35 for forming a signal wave form outputted from the reader 34 to be a digital signal and outputting the same to an unillustrated controller is mounted on the position detecting part 5 by a mounting member 36 fixed on the outer wall of the driving part 4 at a position adjacent to the reader 34 so as not to be out of the casing 2.

The number of the calibrations on the scale 33 moving linearly and reciprocally synchronous with the driving rod 9 are read out by the reader 34. The signal wave form formed by the wave form former 35 is sent to the controller. According to a calculation process by the controller, the operating position of the driving rod 9, that is, the operating position of the jaw members 3, 3 can be detected.

Since the detection principle of the encoder type detecting device itself is already known, further detailed explanation thereof is not given here.

The linear guide mechanism 6 provided between the position detecting part 5 and the driving part 4 comprises a guide rail 6a and a slider 6b slidably along the guide rail 6a. The guide rail 6a is mounted on the outer wall of the driving part 4 parallel with the driving rod 9, and the slider 6b is mounted on the scale supporting member 38. Since the linear guide mechanism 6 is provided accordingly between the position detecting part 5 and the driving part 4, even though the driving rod 9 is interlocked with the relay plate 20 at a position with a different shaft center with respect to the relay shaft 20a, the scale 33 and the pair of the levers 21, 21 can be operated by the driving rod 9 via the relay plate 20 smoothly and certainly without generating twisting.

As mentioned above, the driving part 4, the position detecting part 5 and the linear guide mechanism 6 are assembled at a position in the casing 2 adjacent with each other in the installation domain of the jaw members 3, 3 without protruding sideways therefrom.

In the chuck with the above-mentioned configuration, the jaw members 3, 3 are opened or closed by the movement of the driving rod 9 in the driving part 4 so that a work piece is gripped or released by the jaw members 3, 3. At the time, the number of the calibrations on the scale 33 moving synchronous with the driving rod 9 are read out by the reader 34. The signal wave form outputted from the reader 34 is formed by the wave form former 35 so as to be a digital signal. It is sent to the controller for a calculation process so that the operating position of the driving rod 9, that is, the operating position of the jaw members 3, 3 is detected for all the opening or closing stroke.

Moreover, since the driving part 4, the position detecting part 5 and the linear guide mechanism 6 are assembled efficiently at a position in the casing 2 adjacent with each other in the width of the casing 2, that is, in the installation domain of the jaw members 3, 3, even if the position detecting part 5, the linear guide mechanism 6, or the like are added, the chuck cannot be enlarged thereby. Besides, since the linear guide mechanism 6 is provided between the driving part 4 and the position detecting part 5, the scale 33 can be displaced stably in the state synchronous with the driving rod 9. In particular, even if the driving rod 9 and the relay shaft 20a are not on the same axis, the scale 33 and the levers 21, 21 are operated certainly and stably by the driving rod 9 via the relay plate 20.

Figure 4:
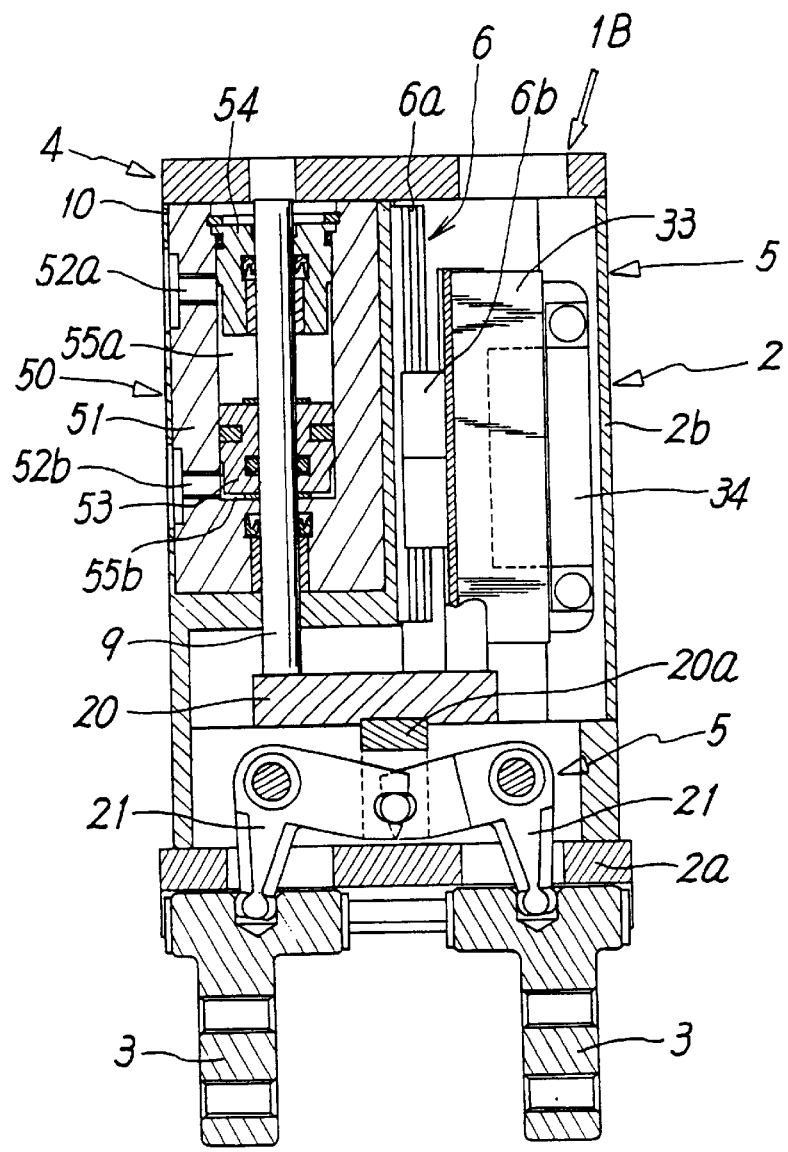
FIG. 4 is a vertical cross-sectional front view showing a second embodiment of a chuck according to the present invention.

FIG. 4 shows a second embodiment of the present invention. A chuck 1B according to the second embodiment differs from that of the first embodiment in that an air cylinder mechanism 50 utilizing the air pressure is used as the driving source for opening or closing the jaw members 3, 3. The air cylinder mechanism 50 comprises a cylindrical cylinder member 51 provided with two ports 52a, 52b on the side surface, a piston 53 stored in the cylinder member 51 slidably, the driving rod 9 interlocked with the piston 53 integrally, and a head cover 54 for closing the free end of the cylinder member 51. The air cylinder mechanism 50 is stored in the cylindrical part 10 of the driving part 4.

In the second embodiment, a compressed air is supplied to or exhausted from a first pressure room 55a and a second pressure room 55b on both sides of the piston 53 from the two ports 52a, 52b alternately for sliding the piston 53 for the linear and reciprocal motion of the driving rod 9.

By using the air cylinder mechanism 50 as the driving source for opening or closing the jaw members 3, 3 as in the second embodiment, compared with the case of using the linear motor 8 as in the first embodiment, a larger gripping force can be obtained.

Since the configuration and the effect of the second embodiment other than the above-mentioned description are substantially same as those of the first embodiment, the main same components are applied with the same numerals as in the first embodiment, and explanation thereof is not given.

As heretofore mentioned, according to the present invention, a chuck capable of detecting the operating position of the jaw members for all the stroke, with a reasonable designing structure with a driving part, a position detecting part and a linear guide mechanism assembled in a casing efficiently without enlargement of the chuck can be obtained.

What is claimed is:

1. A chuck with a position detecting function, comprising:
    a plurality of jaw members for gripping a work piece, the plurality of jaw members provided on an axial end part of a casing and configured to open and close orthogonally to the axis of the casing;
    a driving part having a driving rod linearly and reciprocally movable in parallel to the axis of the casing, the driving part provided on a base end part of the casing on one of right and left sides of the casing;
    a position detecting part configured to detect operating positions of the jaw members, the position detecting part having a scale and a reader, the scale configured to move linearly and reciprocally in parallel to and synchronous with the driving rod and provided adjacent to the driving part on the base end part of the casing, the reader being fixed on a certain position of the casing for reading calibration on the scale;
    a linear guide mechanism provided between the driving part and the position detecting part and configured to guide linear reciprocal movement of the scale; and
    a converting mechanism provided between the jaw members and the driving part and configured to convert linear reciprocal motion of the driving rod into opening and closing operations of the jaw members;
    wherein:
        the converting mechanism comprises two levers for opening and closing the jaw members by swaying, and a relay plate for interlocking the levers with the driving rod; and
        the relay plate is provided with a relay shaft positioned on a center portion of the chuck and having a common shaft positioned to pivot the levers, the relay plate is interlocked with the driving rod and a scale supporting member supporting the scale so as to be capable of being displaced together with the relay shaft.

2. The chuck according to claim 1, wherein:
the linear guide mechanism comprises a guide rail and a slider slidable along the guide rail;
the guide rail is fixed on an outer wall of the driving part parallel to the driving rod; and
the slider is mounted on a scale side.

3. The chuck according to claim 1, wherein the driving rod and the relay plate are interlocked by a floating method via a collar so as to provide a slight freedom therebetween in a tilt direction.

4. The chuck according to claim 1, wherein the driving part includes a linear motor configured to move the driving rod forward and backward.

5. The chuck according to claim 4, wherein:
the linear motor comprises a cylindrical magnetic frame made of a magnetic member, a non-magnetic member bobbin stored in the magnetic frame, a plurality of magnetic coils wound around on the bobbin, and a piston assembly inserted in the bobbin slidably and interlocked with the driving rod; and
the piston assembly comprises a plurality of circular permanent magnets mounted on an outer periphery portion of the driving rod with a yoke interposed therebetween.

6. The chuck according to claim 1, wherein the driving part includes a fluid pressure cylinder mechanism configured to move the driving rod forward and backward.

* * * * *